(12) United States Patent
Peng et al.

(10) Patent No.: US 10,294,620 B1
(45) Date of Patent: May 21, 2019

(54) WAVE-ENERGY ABSORPTION SYSTEM

(71) Applicants: Ta-Hsiung Peng, Kaohsiung (TW);
Kuang-Tsung Peng, Kaohsiung (TW);
Kuang-Chien Peng, Kaohsiung (TW)

(72) Inventors: Ta-Hsiung Peng, Kaohsiung (TW);
Kuang-Tsung Peng, Kaohsiung (TW);
Kuang-Chien Peng, Kaohsiung (TW)

( * ) Notice: Subject to any disclaimer, the term of this patent is extended or adjusted under 35 U.S.C. 154(b) by 0 days.

(21) Appl. No.: 16/107,232

(22) Filed: Aug. 21, 2018

(30) Foreign Application Priority Data

Nov. 17, 2017 (TW) .............................. 106139878 A

(51) Int. Cl.
*E02B 3/06* (2006.01)
(52) U.S. Cl.
CPC ..................... *E02B 3/06* (2013.01)
(58) Field of Classification Search
CPC ..................... E02B 3/04; E02B 3/06
See application file for complete search history.

(56) References Cited

U.S. PATENT DOCUMENTS

| | | | | |
|---|---|---|---|---|
| 227,483 A * | 5/1880 | Case | ............... | E02B 3/04 405/35 |
| 3,953,977 A * | 5/1976 | Kikui | ............... | E02B 3/062 405/27 |
| 4,710,056 A * | 12/1987 | Parker | ............... | E02B 3/04 405/15 |
| 5,636,939 A * | 6/1997 | Brown | ............... | E02B 3/06 405/15 |
| 8,961,067 B1 * | 2/2015 | Peng | ............... | E02B 3/06 405/35 |
| 9,410,300 B2 * | 8/2016 | Atilano | ............... | E02B 3/062 |
| 2008/0310919 A1 * | 12/2008 | Kyung | ............... | E02B 3/06 405/21 |
| 2010/0196098 A1 * | 8/2010 | Danskine | ............... | E02B 3/062 405/25 |
| 2012/0195685 A1 * | 8/2012 | Van de Riet | ............... | E02B 3/04 405/15 |

* cited by examiner

*Primary Examiner* — Benjamin F Fiorello
(74) *Attorney, Agent, or Firm* — Thomas|Horstemeyer, LLP

(57) ABSTRACT

A wave-energy absorbing system has at least one energy absorption device that includes a frame unit and at least one energy absorption unit. The at least one energy absorption unit includes two spaced-apart connecting cables connected between two inclined, opposite sides of the frame unit, and a plurality of spaced-apart energy absorption subunits connected between the connecting cables. Each of the energy absorption subunits has two cable-connecting end portions connected respectively to the connecting cables, a central portion that interconnects the cable-connecting end portions and has opposite lateral ends, and a plurality of energy absorption ribs that extend from opposite lateral ends of the central portion.

10 Claims, 17 Drawing Sheets

US 10,294,620 B1

WAVE-ENERGY ABSORPTION SYSTEM

CROSS-REFERENCE TO RELATED APPLICATION

This application claims priority of Taiwanese Patent Application No. 106139878, filed on Nov. 17, 2017.

FIELD

The disclosure relates to a wave-energy absorption system, and more particularly to an eco-friendly wave-energy absorption system.

BACKGROUND

Traditional coastal defense measures such as seawall and revetment are known for absorbing and dissipating energy of incoming waves of seawater at coastal sites. However, these types of wave-energy absorption system have caused environmental impact to local ecosystems, and are susceptible to flooding and stronger waves caused by storms, which can easily damage their structures and render them nonfunctional. In addition, these defense structures tend to be visually unappealing. As alternatives, flexible forms of coastal defense measures have been sought after.

SUMMARY

Therefore, an object of the disclosure is to provide a wave-energy absorption system that can alleviate the drawback of the prior art.

According to the disclosure, the wave-energy absorption system has at least one energy absorption device. The at least one absorption device includes a frame unit and at least one energy absorption unit.

The frame unit includes two front brace structures, two rear brace structures, and two inclined brace structures. The front brace structures are spaced apart from each other in a left-right direction. The rear brace structures are spaced apart from each other in the left-right direction, are disposed at a rear side of the front brace structures, and are aligned respectively with the front brace structures in a front-rear direction transverse to the left-right direction. Each of the inclined brace structures has a front end that is connected to a respective one of the front brace structures, and a rear end that is higher than and disposed at a rear side of the front end, and that is connected to a respective one of the rear brace structures which is aligned with the respective one of the front brace structures in the front-rear direction.

The at least one energy absorption unit includes two connecting cables and a plurality of energy absorption subunits. The connecting cables extend along the left-right direction, are connected between the inclined brace structures, and are spaced apart from each other. The energy absorption subunits are connected between the connecting cables, and are spaced apart from each other in the left-right direction. Each of the energy absorption subunits has two cable-connecting end portions, a central portion and a plurality of energy absorption ribs. The cable-connecting end portions are connected respectively to the connecting cables. The central portion interconnects the cable-connecting end portions and has opposite lateral ends in the left-right direction. The energy absorption ribs extend from opposite lateral ends of the central portion.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
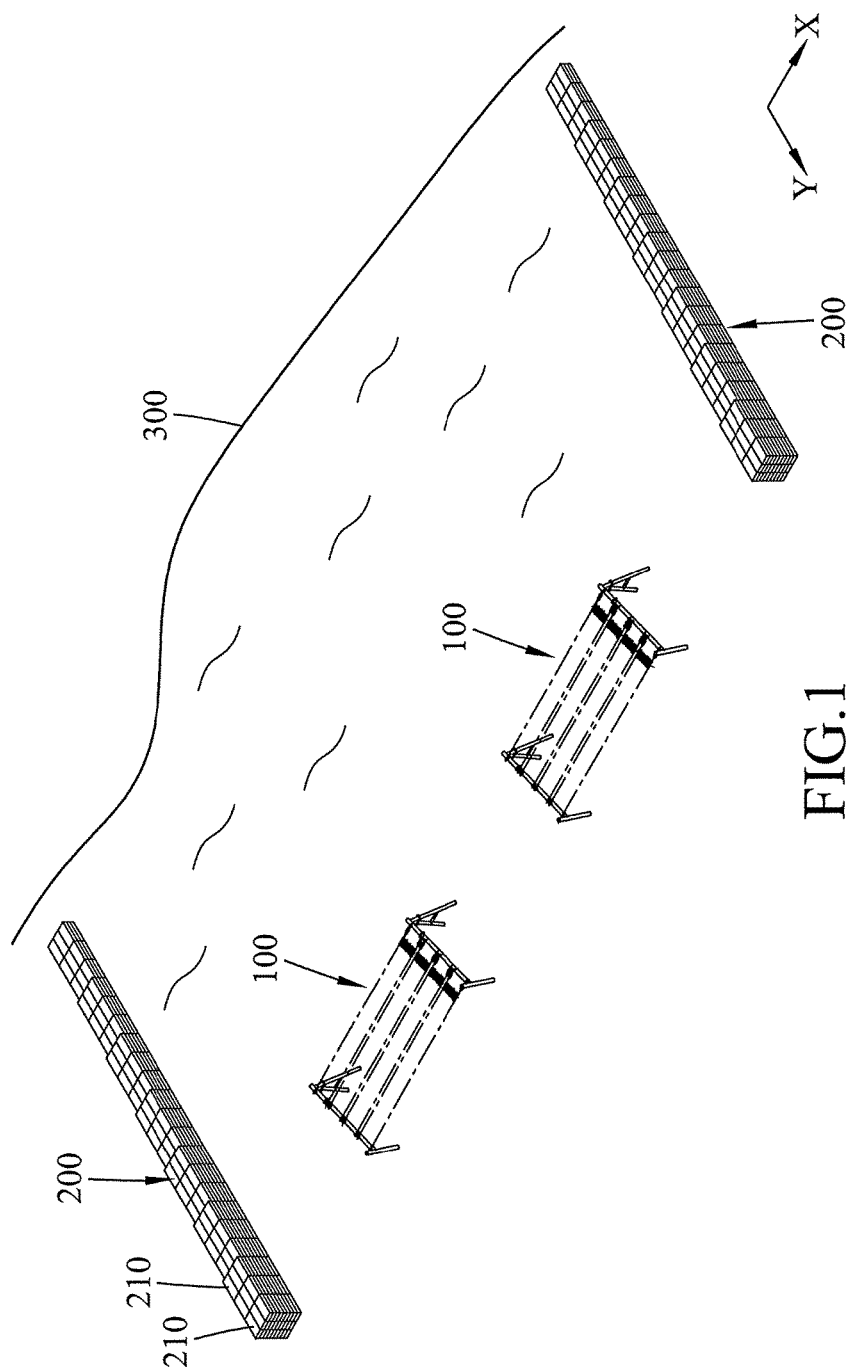
FIG. 1 is a fragmentary perspective view of a first embodiment of the wave-energy absorption system according to the disclosure, which includes a plurality of energy absorption devices.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
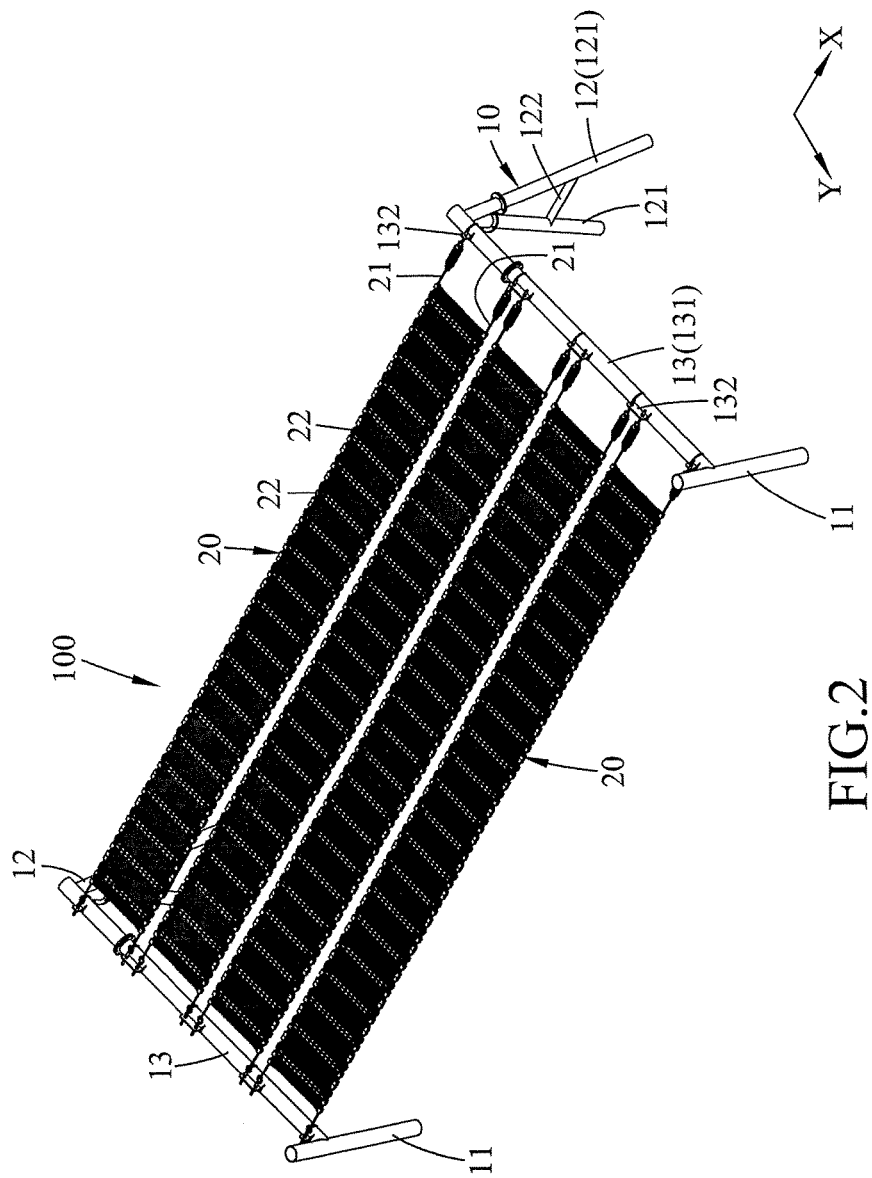
FIG. 2 is a perspective view of any one of the energy absorption devices of the first embodiment.

Referring to FIGS. 1 and 2, a first embodiment of a wave-energy absorption system according to the disclosure has two energy absorption devices 100 that are spaced apart from each other in a left-right direction (X) and two sandbag jetties 200. In this embodiment, the wave-energy absorption system is adapted to be mounted on a sandy coast 300. In other embodiments, the wave-energy absorption system may have only one energy absorption device 100 instead.

Figure 3:
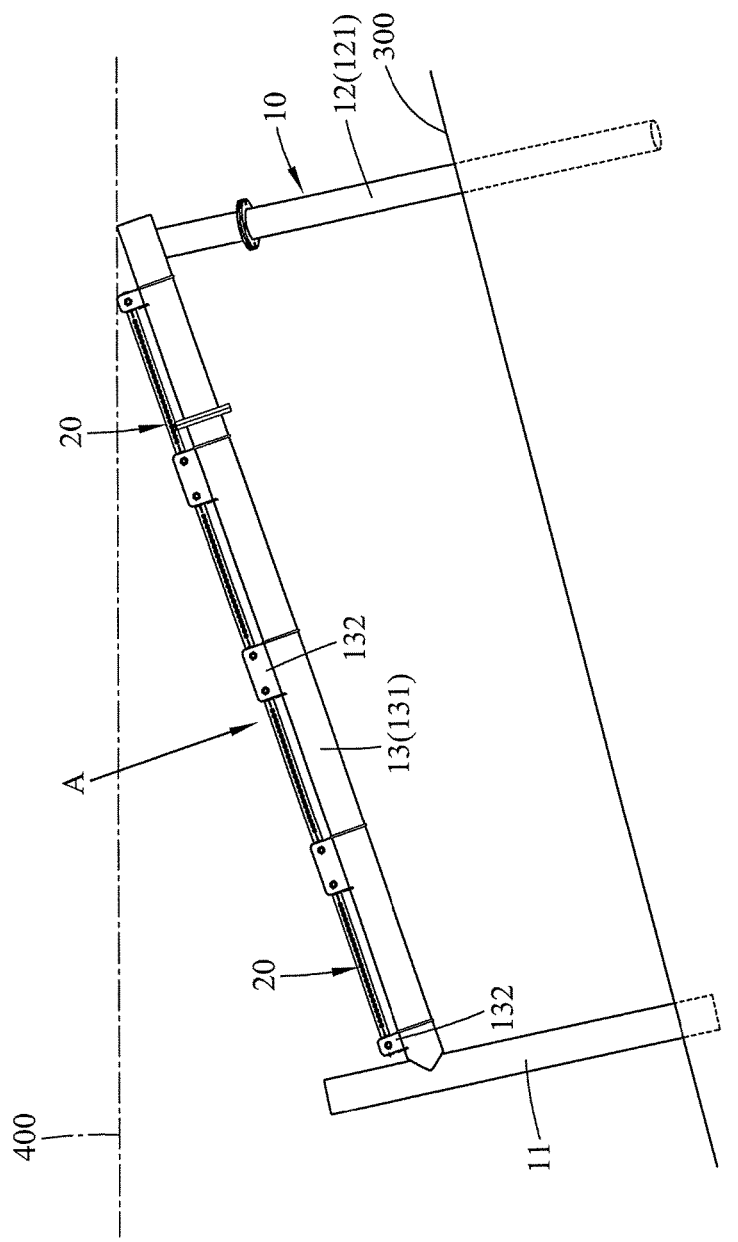
FIG. 3 is a side view of anyone of the energy absorption devices of the first embodiment.

In this embodiment, each of the energy absorption devices 100 includes a frame unit 10 and a plurality of energy absorption units 20. Referring to FIGS. 2 and 3, the frame unit 10 includes two front brace structures 11 that are spaced apart from each other in the left-right direction (X), two rear brace structures 12 that are spaced apart from each other in the left-right direction (X), and two inclined brace structures 13. The rear brace structures 12 are disposed at a rear side of the front brace structures 11, and are aligned respectively with the front brace structures 11 in a front-rear direction (Y) transverse to the left-right direction (X). Each of the inclined brace structures 13 has a front end that is connected to a respective one of the front brace structures 11, and a rear end that is higher than and disposed at a rear side of the front end, and that is connected to a respective one of the rear brace structures 12 which is aligned with the respective one of the front brace structures 11 in the front-rear direction (X).

In the first embodiment, each of the rear brace structures 12 includes two rear braces 121, each of which is elongated and has a top end inclined toward the top end of the other one of the rear braces 121. Each of the rear brace structures 12 further includes a connecting plate 122 connected between the rear braces 121. The rear braces 121 and the connecting plate 122 cooperatively form an A-shaped structure (as shown in FIG. 2). Each of the inclined brace structures 13 includes an inclined brace body 131 that is connected to the respective one of the front brace structures 11 and the respective one of the rear brace structures 12, and a plurality of spaced-apart securing pieces 132 that are connected to the inclined brace body 131.

Figure 4:
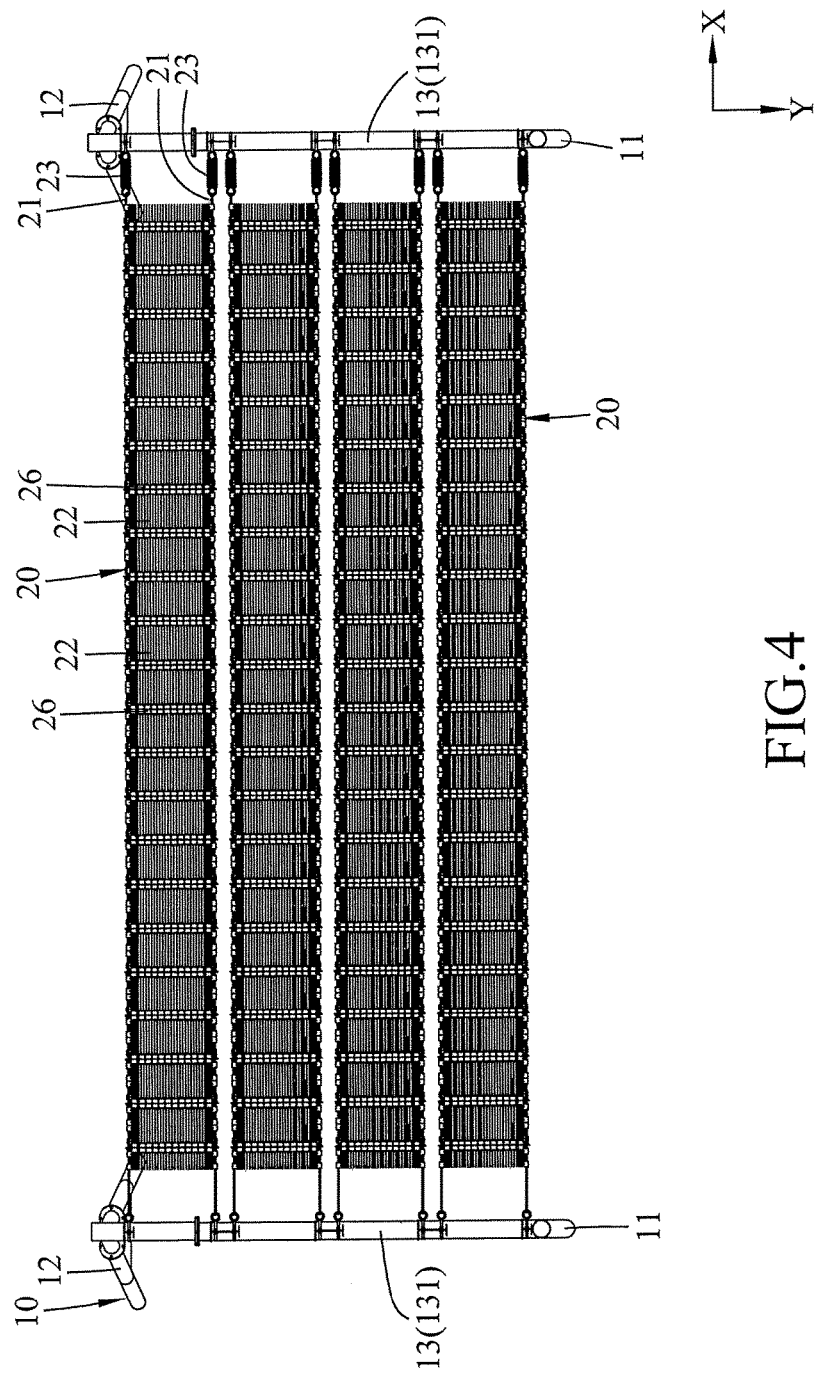
FIG. 4 is a view from a direction (A) in FIG. 3.
Figure 5:
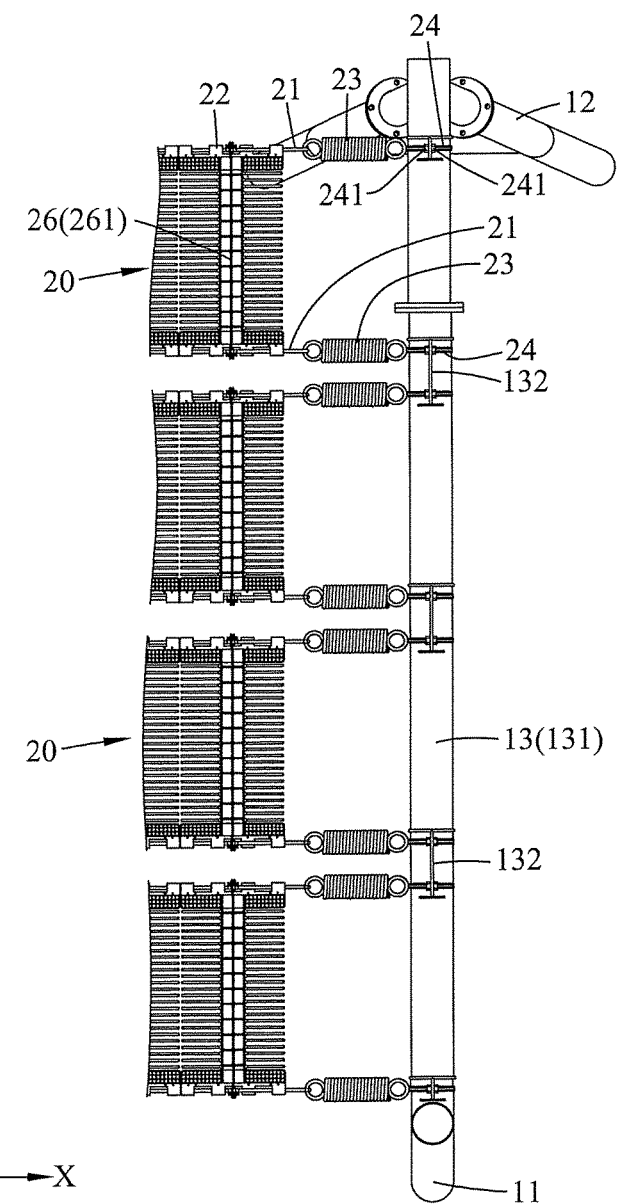
FIG. 5 is a fragmentary enlarged view of FIG. 4, illustrating that the energy absorption device includes a frame unit and a plurality of energy absorption units, and that each energy absorption unit has one end secured to the frame unit by two first fasteners.
Figure 6:
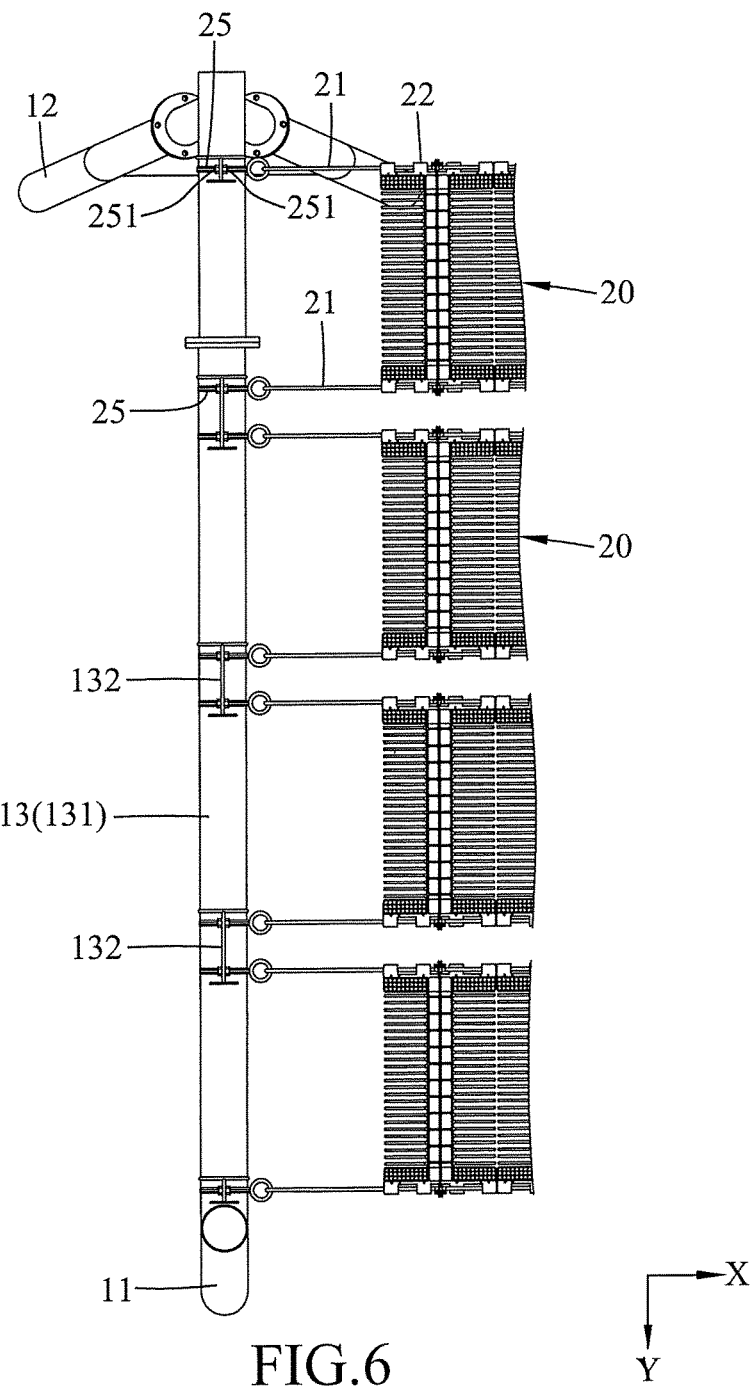
FIG. 6 is a view similar to FIG. 5, but illustrating that each energy absorption unit has an opposite end secured to the frame unit by two second fasteners.

Referring to FIGS. 4 to 6, for each of the energy absorption devices 100, each of the energy absorption units 20 are mounted between the inclined brace structures 13. Each of the absorption units 20 includes two spaced-apart connecting cables 21, a plurality of energy absorption subunits 22, two first springs 23, two first fasteners 24, and two second fasteners 25. The connecting cables 21 extend along the left-right direction (X) and are connected between the inclined brace structures 13. The energy absorption subunits 22 are connected between the connecting cables 21 and are spaced apart from each other in the left-right direction (X). The two first springs 23 are proximate to each other, and each of the first springs 23 is connected to an end of a respective one of the connecting cables 21. The first fasteners 24 are connected respectively to the first springs 23. Each of the second fasteners 25 is connected to an opposite end of a respective one of the connecting cables 21. As further shown in FIG. 7, each of the absorption units 20 further includes a plurality of support cable subunits 26 connected respectively to the energy absorption subunits 22.

Specifically, for each of the energy absorption devices 100, the first fasteners 24 of each of the energy absorption units 20 are adjustably and respectively secured to a corresponding pair of the securing pieces 132 which are connected to the inclined brace body 131 of one of the inclined brace structures 13, and the second fasteners 25 are adjustably and respectively secured to a corresponding pair of the securing pieces 132 which are connected to the inclined brace body 131 of the other one of the inclined brace structures 13. In this embodiment, the first fasteners 24 are secured to the corresponding securing pieces 132 by nuts 241, and the second fasteners 25 are secured to the corresponding securing pieces 132 by nuts 251. The combination of the first springs 23, the first fasteners 24 and the second fasteners 25 may easily adjust the elasticity of the connecting cables 21 for absorbing energy carried by the energy absorption subunits 22 into the sandy coast 300.

Figure 7:
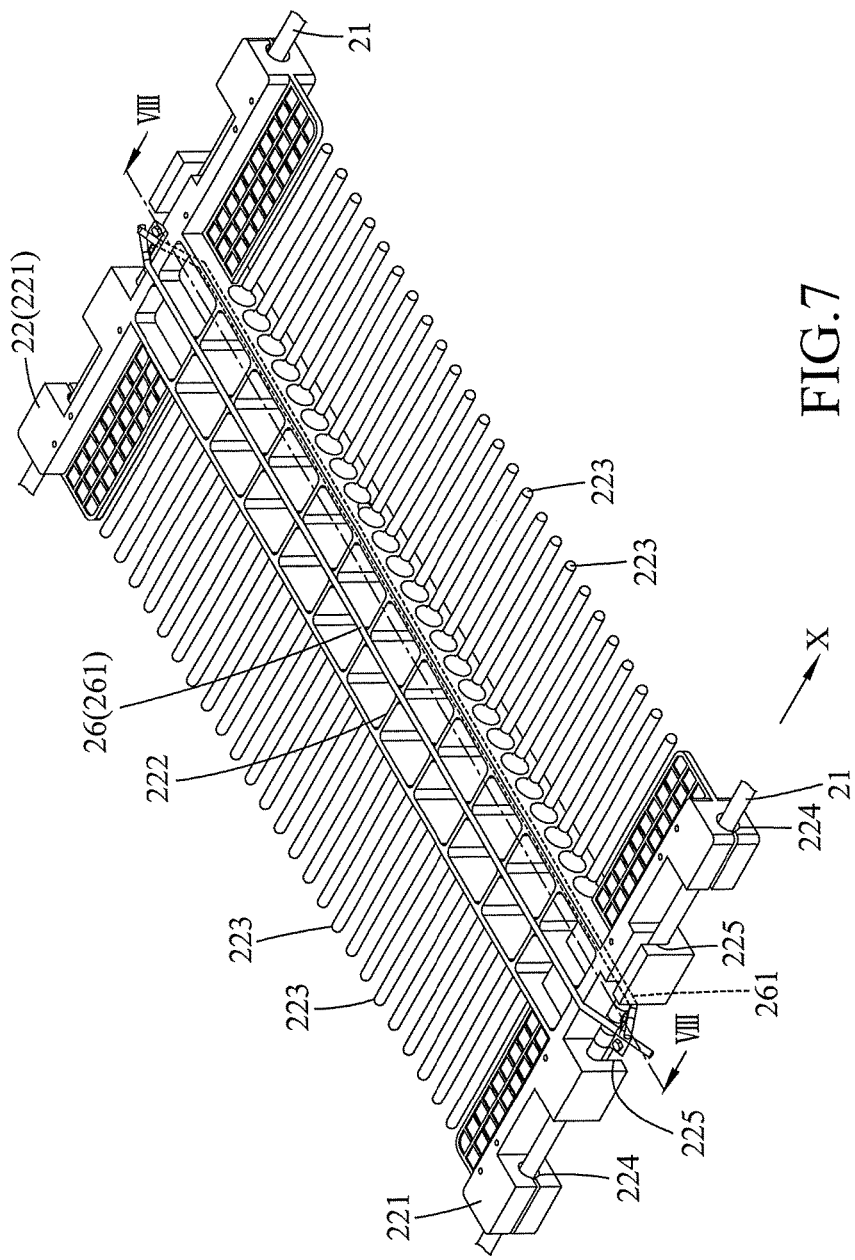
FIG. 7 is a perspective view of an energy absorption subunit of any one of the energy absorption units.
Figure 8:
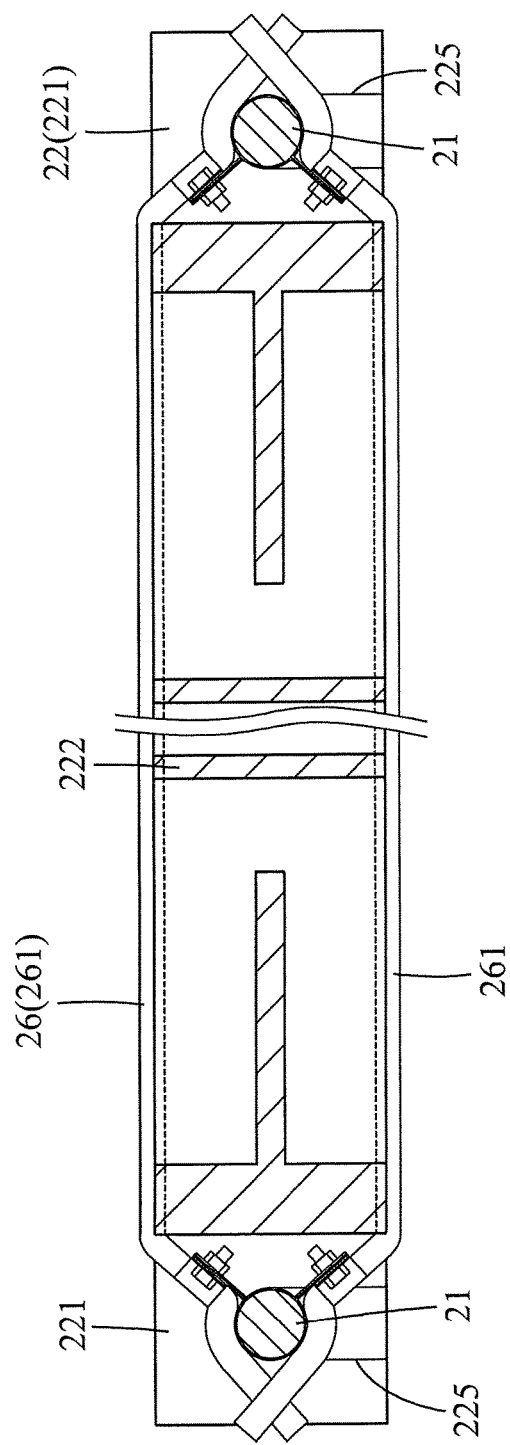
FIG. 8 is a fragmentary sectional view taken along line VIII-VIII in FIG. 7.

Referring to FIGS. 4, 7 and 8, for each of the energy absorption units 20, each of the energy absorption subunits 22 has two cable-connecting end portion 221 that are connected respectively to the connecting cables 21, a central portion 222 that interconnects the cable-connecting end portions 221 and that has opposite lateral ends in the left-right direction (X), and a plurality of energy absorption ribs 223 that extend from opposite lateral ends of the central portion 222. In this embodiment, each of the cable-connecting end portions 221 is formed with two through holes 224 and two open grooves 225. For each of the energy absorption units 20, one of the connecting cables 21 extends through the through holes 224 and the open grooves 225 of one of the cable-connecting end portions 221 of each energy absorption subunit 22, and the other one of the connecting cables 21 extends through the through holes 224 and the open grooves 225 of the other one of the cable-connecting end portions 221 of each energy absorption subunit 22. In this embodiment, for each of the cable-connecting end portion 221, one of the open grooves 225 faces upward, and the other one of the open grooves 225 faces downward.

For each of the energy absorption units 20, each of the support cable subunits 26 includes two support cables 261 that are connected respectively top and bottom ends of the central portion 222 of a respective one of the energy absorption subunits 22. Each of the support cables 261 has opposite ends that are connected respectively to the connecting cables 21. The support cables 261 reinforce and strengthen the structural strength of the central portion 222 from breaking apart by external forces, such as those from incoming waves of seawater. In this embodiment, for each of the energy absorption units 20, the opposite ends of each of the support cables 261 are secured respectively to the connecting cables 21 by two R-shaped clips in combination with screws and nuts (as shown in FIG. 8).

Referring back to FIG. 1, the sandbag jetties 200 are spaced apart from and disposed respectively at opposite sides of the energy absorption devices 100 in the left-right direction (X). Each of the sandbag jetties extends in the front-rear direction (Y) and includes a plurality of sandbags 210 stacked together. This setup of sandbag jetties 200 protects the energy absorption devices 100 from collapsing due to the waves of seawater flowing in the left-right direction (X).

Whenever the incoming waves flow toward the sandy coast 300 in the front-rear direction (Y) through the energy absorption subunits 22 of each of the energy absorption units 20, besides absorbing energy from the incoming waves passing therethrough, the energy absorption subunits 22 may also dredge sediments from the incoming waves.

With the abovementioned details scrutinized, the benefit of the disclosure may be summarized as the following:

1. The energy absorption subunits 22 of each of the energy absorption units 20 may be formed as a multi-pore energy-absorbing structure. When the incoming waves flow through the energy absorption subunits 22, elastic force from the first springs 23 of the energy absorption units 20 may countermeasure the force the incoming waves exerted onto the energy absorption subunits 22, reducing overall energy of the incoming waves that pass therethrough. Also, the energy absorption ribs 223 of the energy absorption subunits 22 deform and collide with the incoming waves passing therethrough to reduce the overall energy of the incoming waves as well. The overall energy of the incoming waves is further reduced by the energy absorption subunits 22 every single time the incoming waves pass therethrough.

2. With the energy of the incoming waves reduced by the energy absorption subunits 22, the energy absorption devices 100 may act as dredging devices for trapping sediments that are too heavy for the weakened incoming waves to carry back into the ocean.

3. The setup of sandbag jetties 200 prevents the energy absorption devices 100 from collapsing due to the incoming waves flowing in the left-right direction (X), thereby allowing the energy absorption devices 100 to remain standing on the sandy coast 300.

4. The height of the frame unit 10 may be easily adjusted to be below the sea level 400 (shown in FIG. 3), optimal for visual needs.

Figure 9:
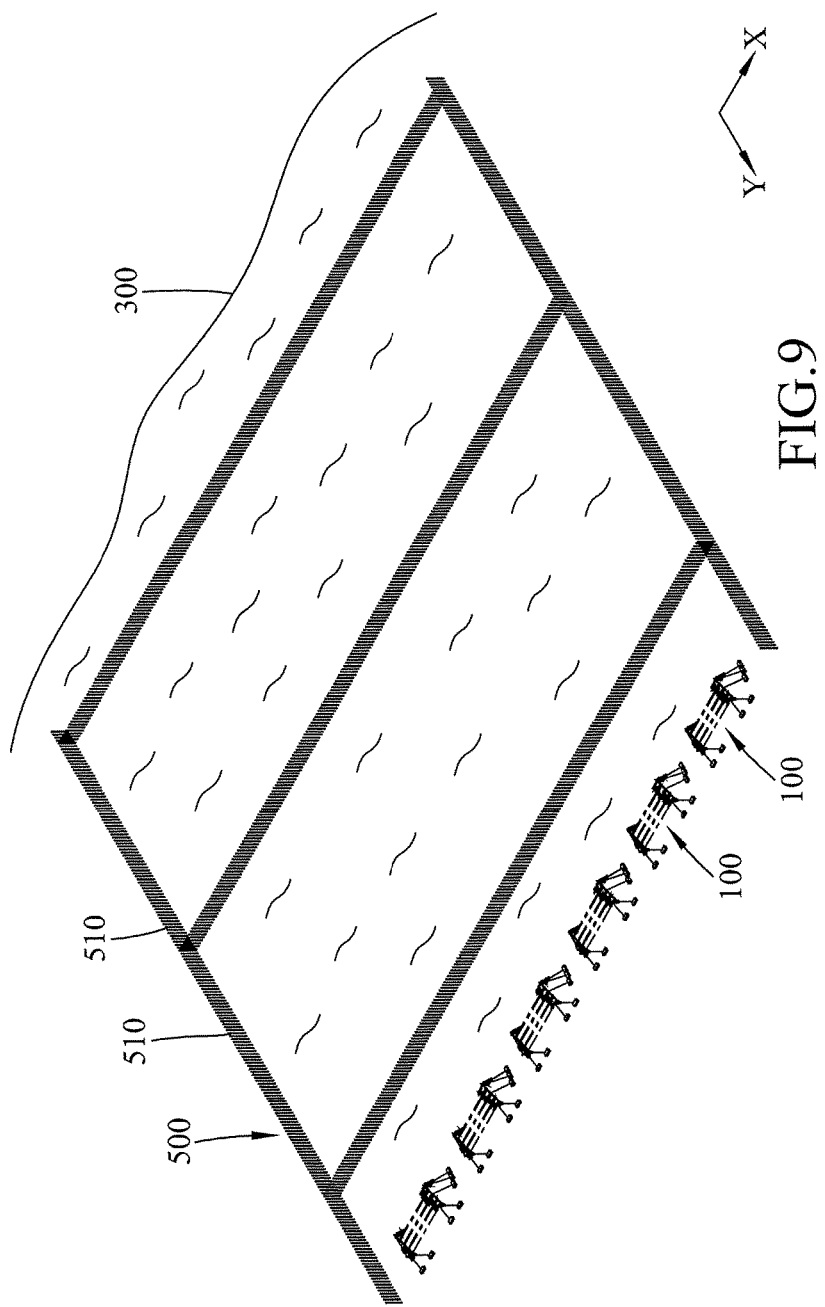
FIG. 9 is a fragmentary perspective view of a second embodiment of the wave-energy absorption system according to the disclosure, which includes a plurality of energy absorption devices.
Figure 10:
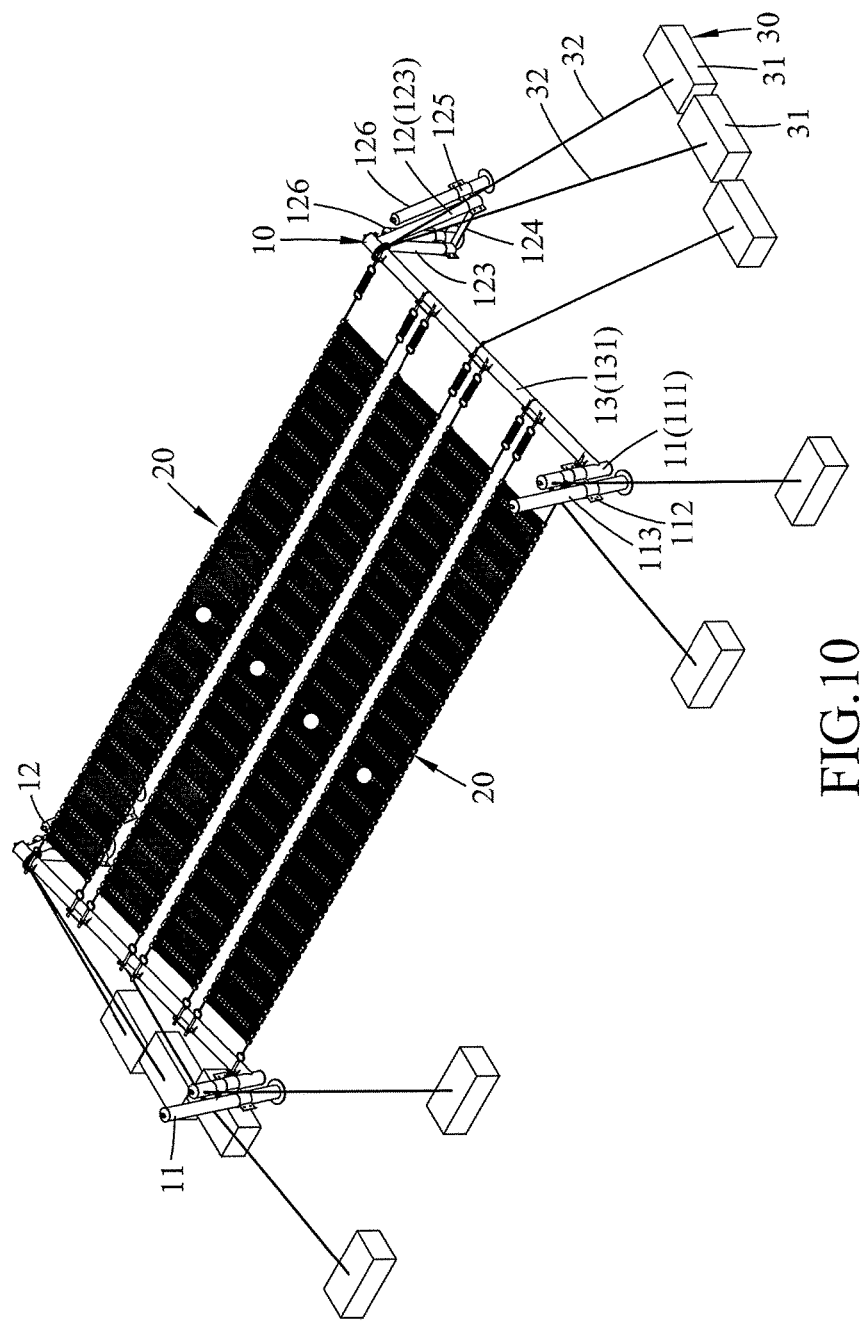
FIG. 10 is a perspective view of any one of the energy absorption devices of the second embodiment in a default position.

Referring to FIGS. 9 and 10, a second embodiment of the disclosure is similar to that of the first embodiment. In this embodiment, the sandbag jetties 200 (shown in FIG. 1) are replaced by a fence unit 500. The fence unit 500 is formed with a plurality of bamboos 510 mounted and arranged along the sandy coast 300, and serves to surround the energy absorption devices 100. As long as the fence unit 500 is capable of confining the energy absorption devices 100, the fence unit 500 may be formed with other organic materials instead, such as any types of wood.

Figure 11:
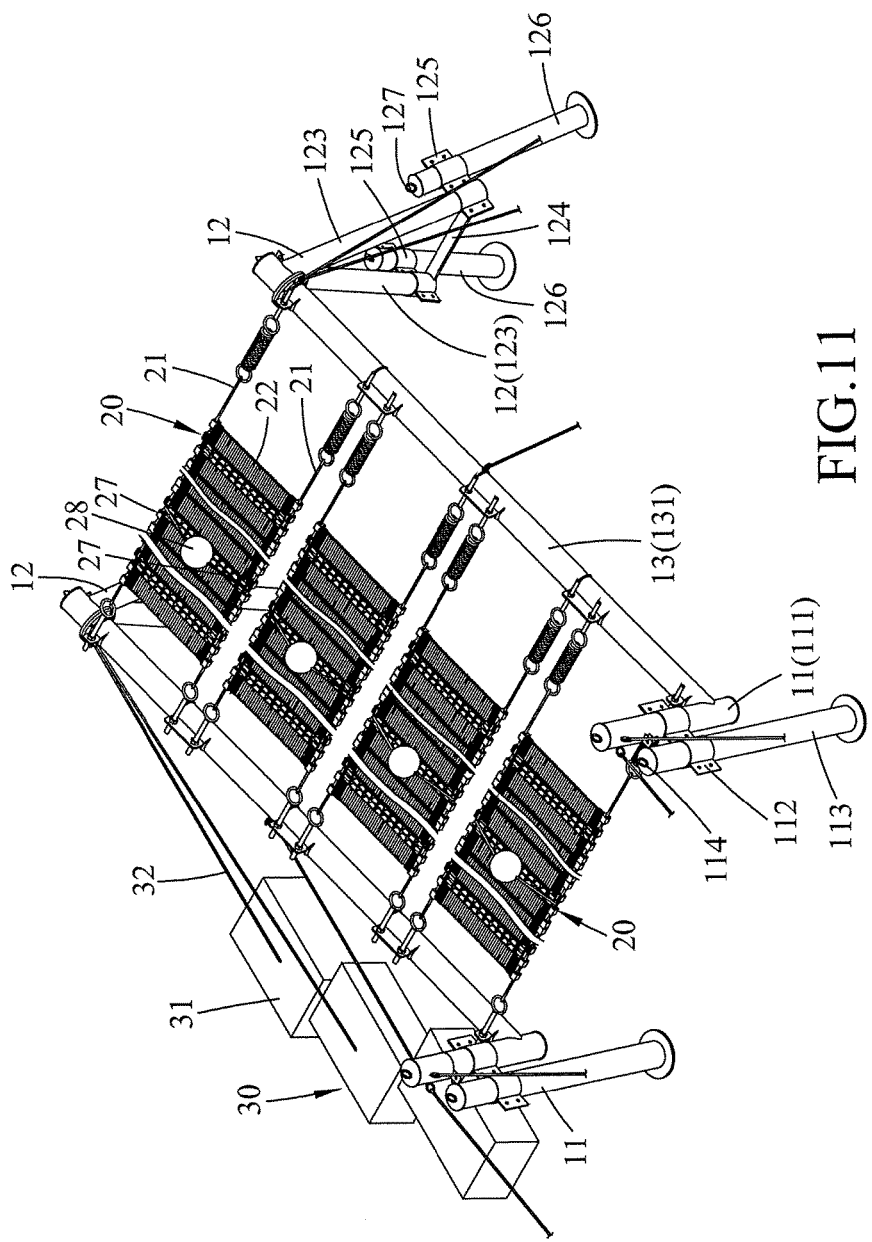
FIG. 11 is a fragmentary perspective view of the energy absorption device of the second embodiment in an extended position, in which lower front legs of front brace structures of the frame unit and lower rear legs of rear brace structures of the frame unit extend downward.
Figure 12:
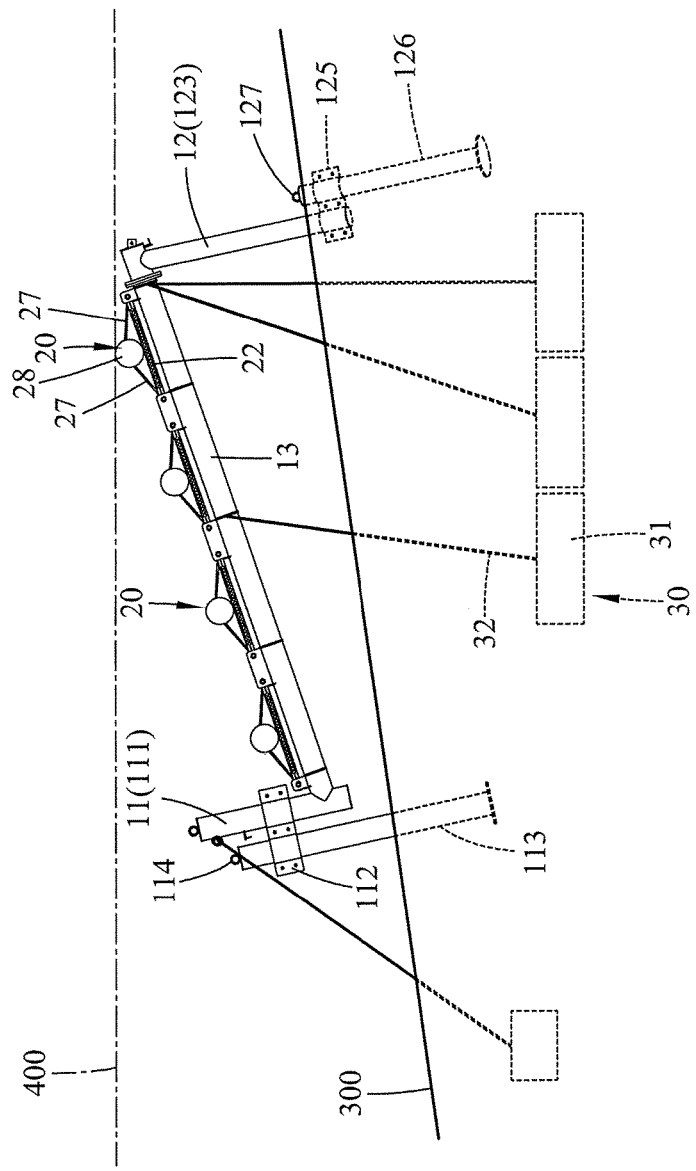
FIG. 12 is a side view of the energy absorption device of the second embodiment mounted to a sandy coast in the extended position.

Referring to FIGS. 10 to 12, each of the front brace structures 11 of the frame unit 10 has an upper front leg 111, a front brace clamp 112 that is mounted to the upper front leg 111, and a lower front leg 113 that has a front hook-connecting ring 114, and that is clamped to the front brace clamp 112. The front brace clamp 112 is operable to permit movement of the lower front leg 113 relative to the upper front leg 111 in a direction parallel to the upper front leg 111. Similarly, each of the rear brace structures 12 of the frame unit 10 has two upper rear legs 123, a coupling plate 124, two rear brace clamps 125 that are respectively mounted to the upper rear legs 123, and two lower rear legs 126. Each of the upper rear legs 123 is elongated, and has a top end inclined toward the top end of the other one of the upper rear legs 123, and a bottom end interconnected to the bottom end of the other one of the upper rear legs 123 by the coupling plate 124. Each of the lower rear legs 126 has a rear hook-connecting ring 127, and is clamped to a respective one of the rear brace clamps 125. Each of the rear brace clamps 125 is operable to permit movement of a respective one of the lower rear legs 126 relative to a respective one of the upper rear legs 123 in a direction parallel to the upper rear legs 123.

In the second embodiment, when each of the energy absorption devices 100 is mounted on the sandy coast 300, it is shown to be reconfigured, from a default position (as shown in FIG. 10) to an extended position (as shown in FIGS. 11 and 12). While each of the energy absorption devices 100 is in the extended position, the lower front legs 113 of the front brace structures 11 of the frame unit 10 and lower rear legs 126 of rear brace structures 12 of the frame unit 10 are extended downward into the sandy coast 300 for providing each of the energy absorption devices 100 a deep foundation against external forces.

In order to assist the frame unit 10 in maintaining an upright and fixed position on the sandy coast 300, each of the energy absorption units 20 further includes two float ropes 27 and a float 28, and each of the energy absorption devices 100 further includes a ground anchor unit 30. For each of the energy absorption units 20, the float ropes 27 are respectively connected to the connecting cables 21, and the float 28 is connected to the float cables 27. For each of the energy absorption devices 100, the ground anchor unit 30 has a plurality of positioning blocks 31 and a plurality of connecting ropes 32. The positioning blocks 31 are buried beneath the sediments underwater, and the connecting ropes 32 are connected to the frame unit 10 and are respectively connected to the positioning blocks 31.

The second embodiment retains the same functionality as that of the first embodiment, with several additional benefits. For each of the energy absorption units 20, the float 28 develops buoyant force in water, which allows the energy absorption subunits 22 to oscillate against the incoming waves for absorbing energy therefrom. The float 28 may also keep the energy absorption subunits 22 afloat from being completely engulfed by the sediments underwater. Also, the fence unit 500 may serve to dredge sediment and absorb residual energy from the incoming waves after they have passed through the energy absorption device 100.

Figure 13:
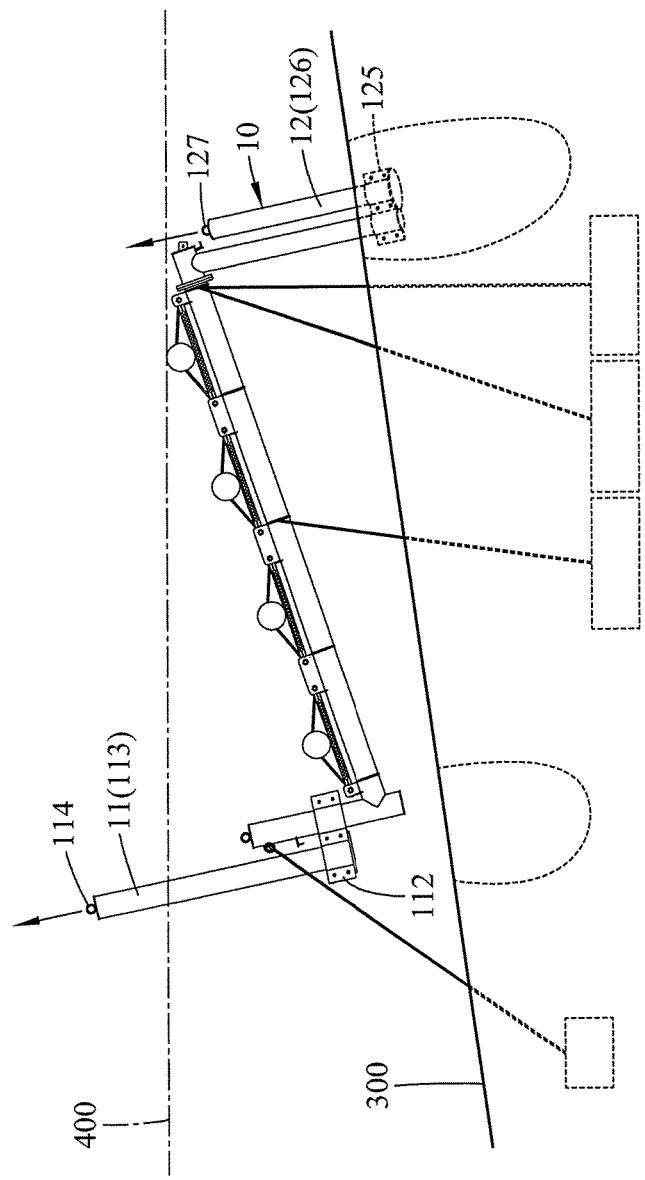
FIG. 13 is a view similar to FIG. 12, but illustrating the absorption device being reverted to the default position during removal thereof from the sandy coast.
Figure 14:
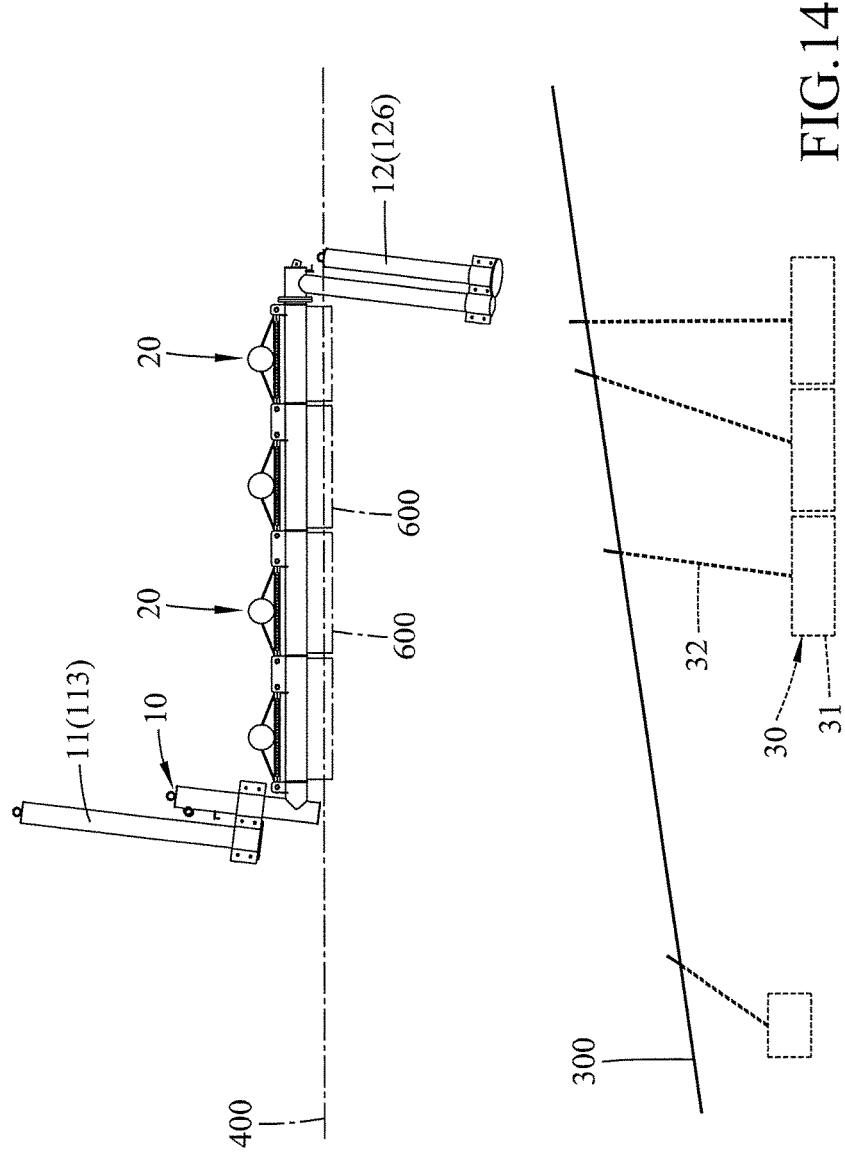
FIG. 14 is a side view illustrating the absorption device floating at sea level during removal thereof from the sandy coast.

In addition, as shown in FIGS. 13 and 14, each of the energy absorption devices 100 of the second embodiment of the disclosure may be reclaimed for reuse once a specific amount of sediments have been dredged at its current location. Initially, during a high tide, a user may pump water to remove the sediments surrounding the lower front legs 113 of the front brace structures 11 of the frame unit 10 and the lower rear legs 126 of the rear brace structures 12 of the frame unit 10 on the sandy coast 300, and may release the front and rear brace clamps 112, 125 to permit the movement of the respective one of the lower front and rear legs 113, 126. Then, the user may pull the lower front and rear legs 113, 126 upward and away from the sandy coast 300 (upward pull indicated by the arrows in FIG. 13) by a hooking mechanism, in which each of the front hook-connecting rings 114 of the lower front legs 113 and each of the rear hook-connecting rings 127 of the lower rear legs 126 are hooked and pulled upward by a chain block. After the user cuts off the connecting ropes 32 of the ground anchor unit 30, each of the energy absorption devices 100 may easily be carried by a plurality of floating boards 600 to a new location for reuse. It should be noted that, a new set of ground anchor unit 30 is needed for each of the energy absorption devices 100 in the new location.

Figure 15:
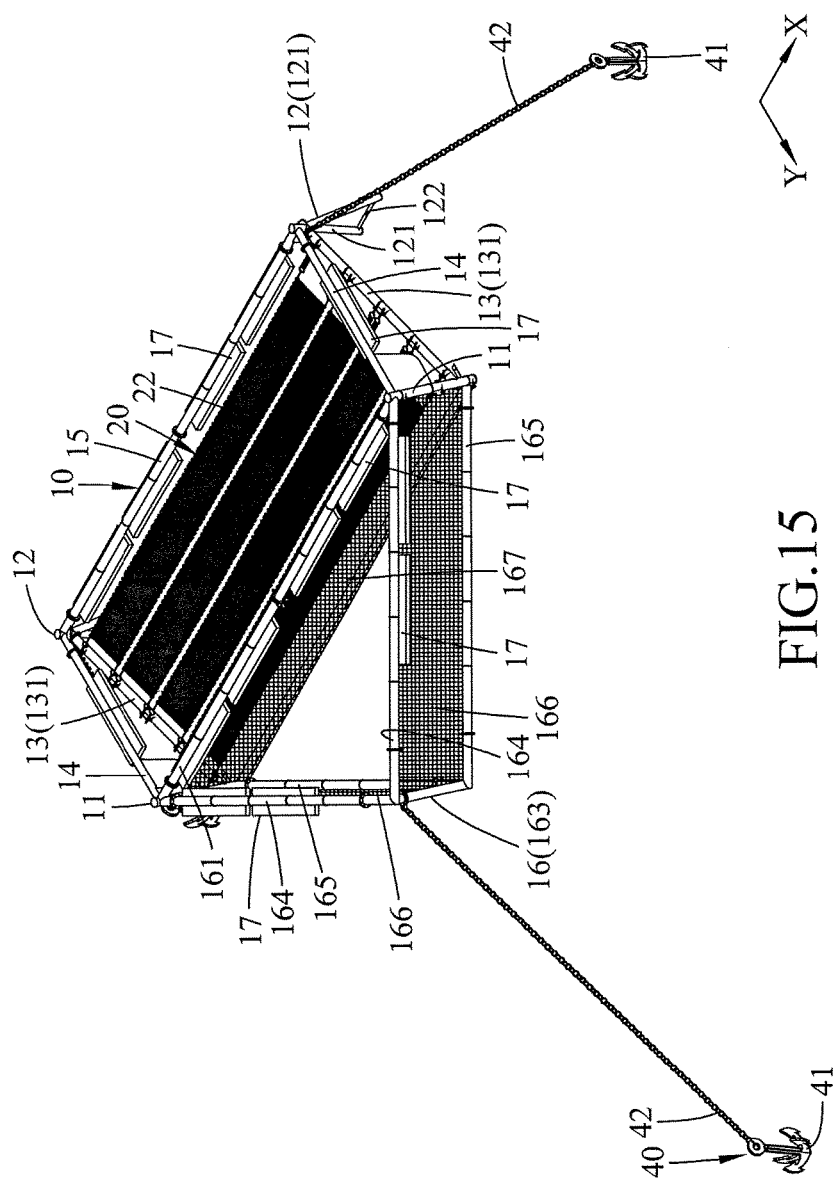
FIG. 15 is a perspective view of an energy absorption device of a third embodiment of the wave-energy absorption system according to the disclosure.
Figure 16:
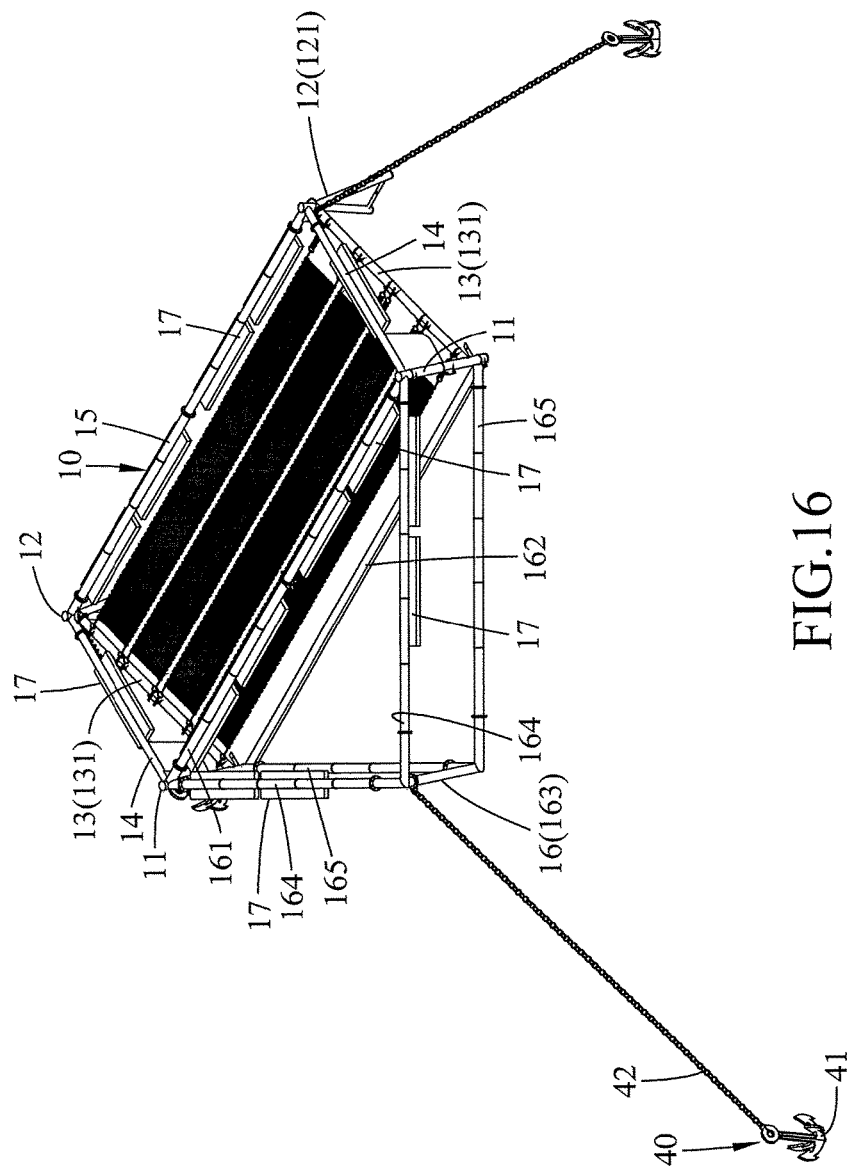
FIG. 16 is a view similar to FIG. 15 with stainless steel front and rear nets of wave-breaking structure being omitted.
Figure 17:
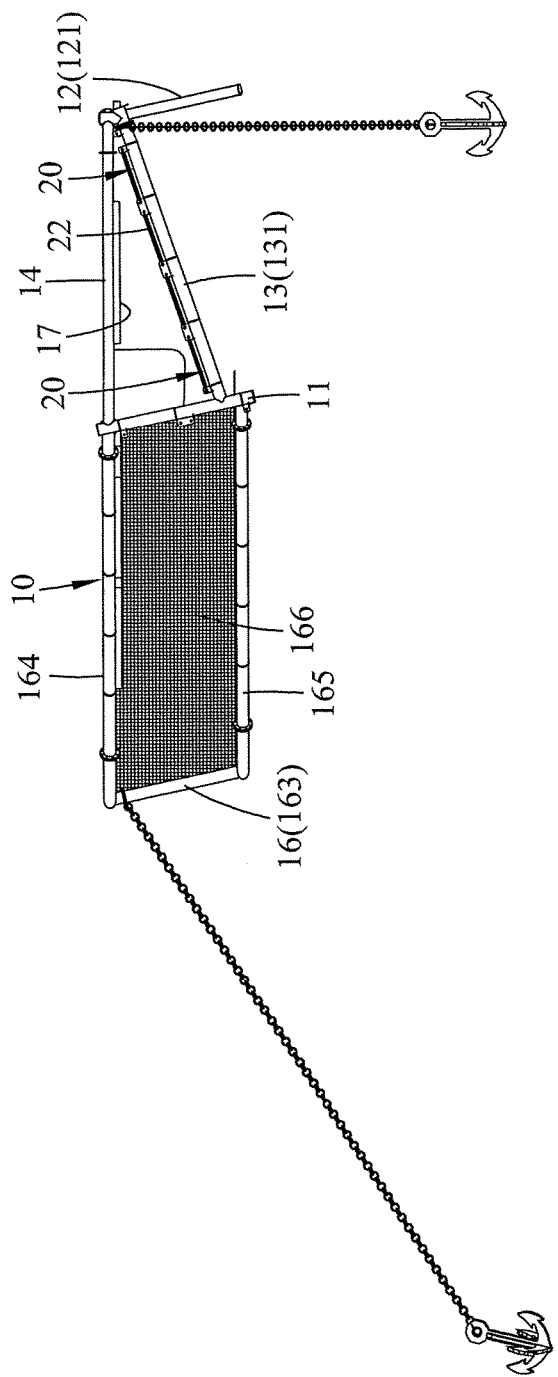
FIG. 17 is a side view of the energy absorption device of the third embodiment.

Referring to FIGS. 15 to 17, a third embodiment of the disclosure is similar to that of the first embodiment. In this embodiment, the sandbag jetties 200 (shown in FIG. 1) are absent, and each energy absorption device 100 further includes an anchor unit 40. The frame unit 10 of each energy absorption device 100 further includes two support braces 14, a rear transverse brace 15, a wave-breaking structure 16, and a plurality of floating boards 17. Each of the support braces 14 is disposed above a respective one of the inclined brace structures 13, and interconnects a top end of a respective one of the front brace structures 11 and a top end of a respective one of the rear brace structure 12. The rear transverse brace 15 extends in the left-right direction (X) and interconnects the top ends of the rear brace structures 12.

The wave breaking structure 16 is mounted to the front brace structure 11 and has an upper transverse brace 161, a lower transverse brace 162, a front end brace 163, two upper connecting braces 164, two lower connecting braces 165, two stainless steel front nets 166, and a stainless steel rear net 167. The upper transverse brace 161 extends in the left-right direction (X) and interconnects the top ends of the front brace structures 11. Likewise, the lower transverse brace 162 extends in the left-right direction (X) and interconnects bottom ends of the front brace structures 11. The front end brace 163 is disposed in front of the upper and lower transverse braces 161, 162. Each of the upper connecting braces 164 interconnects a top end of the front end brace 163 and the top end of a respective one of the front brace structures 11. Each of the lower connecting braces 165 is disposed below a respective one of the upper connecting braces 164, and interconnects a bottom end of the front end brace 163 and the bottom end of a respective one of the front brace structures 11. Each of the stainless steel front nets 166 is mounted in a space collectively defined by the front end brace 163, a corresponding one of the upper connecting braces 164, a corresponding one of the lower connecting braces 165, and a corresponding one of the front brace structures 11. The stainless steel rear net 167 is mounted in a space collectively defined by the brace structures 11, the upper transverse brace 161 and the lower transverse brace 162.

In the third embodiment, each of the front brace structures 11, the rear braces 121 of the rear brace structures 12, the inclined brace bodies 13 of the inclined brace structure 13, the support braces 14, the rear transverse brace 15, and the upper and lower transverse braces 161, 162, the front end brace 163 and the upper and lower connecting braces 164, 165 of the wave-breaking structure 16 is configured as a tube, which may float in water, with opposite ends thereof being closed. The floating boards 17 are mounted to the support braces 14, the rear transverse brace 15, the upper transverse brace 161 and the upper connecting braces 164 of the wave-breaking structure 16.

The anchor unit 40 includes a plurality of positioning anchors 41, and a plurality of anchor-connecting cables 42. Each of the anchor-connecting cables 42 connects a respective one of the positioning anchors 41 to the frame unit 10.

The anchor unit 40 serves to anchor the frame unit 10 floating in water from drifting away and being carried away by ocean currents. The third embodiment is especially useful for securing the energy absorption device 100 at sites with rocky shores. The functionality of the energy absorption subunits 22 is the same as that of the first embodiment, capable of dredging sediments for forming seashore landscape thereat. In addition, the stainless steel front and rear nets 166, 167 of the wave-breaking structure 16 may absorb energy from incoming waves alongside the energy absorption subunits 22. Overall, the wave-energy absorption system of this disclosure serves to absorb energy of the incoming waves of seawater, mitigating the impact of coastal erosion as well as dredging sediments for rebuilding seashore landscape. Reinforced design of the system further strengthens its stability to have a longer service life.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A wave-energy absorption system comprising at least one energy absorption device (100) that includes:
    a frame unit (10) including
        two front brace structures (11) that are spaced apart from each other in a left-right direction (X),
        two rear brace structures (12) that are spaced apart from each other in the left-right direction (X), that are disposed at a rear side of said front brace structures (11), and that are aligned respectively with said front brace structures (11) in a front-rear direction (Y) transverse to the left-right direction (X), and
        two inclined brace structures (13), each having a front end that is connected to a respective one of said front brace structures (11), and a rear end that is higher than and disposed at a rear side of said front end, and that is connected to a respective one of said rear brace structures (12) which is aligned with the respective one of said front brace structures (11) in the front-rear direction (Y); and
    at least one energy absorption unit (20) including
        two connecting cables (21) that extend along the left-right direction (X), that are connected between said inclined brace structures (13), and that are spaced apart from each other, and
        a plurality of energy absorption subunits (22) that are connected between said connecting cables (21), and that are spaced apart from each other in the left-right direction (X), each of said energy absorption subunits (22) having
            two cable-connecting end portions (221) that are connected respectively to said connecting cables (21),
            a central portion (222) that interconnects said cable-connecting end portions (221), and that has opposite lateral ends in the left-right direction (X), and
            a plurality of energy absorption ribs (223) that extend from opposite lateral ends of said central portion (222).

2. The wave-energy absorption system as claimed in claim 1, wherein said at least one energy absorption device (100) includes a plurality of said energy absorption units (20).

3. The wave-energy absorption system as claimed in claim 2, wherein:
    each of said inclined brace structures (13) of said frame unit (10) includes
        an inclined brace body (131) connected to the respective one of said front brace structures (11) and the respective one of said rear brace structures (12), and
        a plurality of spaced-apart securing pieces (132) connected to said inclined brace body (131);
    each of said energy absorption units (20) further includes
        two first springs (23), each being connected to an end of a respective one of said connecting cables (21),
        two first fasteners (24) connected respectively to said first springs (23), and adjustably and respectively secured to a corresponding pair of said securing pieces (132) which are connected to said inclined brace body (131) of one of said inclined brace structures (13); and two second fasteners (25), each being connected to an opposite end of a respective one of said connecting cables (21), and adjustably secured to a corresponding pair of said securing pieces (132) which are connected to said inclined brace body (131) of the other one of said inclined brace structures (13).

4. The wave-energy absorption system as claimed in claim 3, wherein:

each of said cable-connecting end portions (221) of said energy absorption subunits (22) is formed with a plurality of through holes (224) and a plurality of open grooves (225); and for each of said energy absorption units (20), one of said connecting cables (21) extends through said through holes (224) and said open grooves (225) of one of said cable-connecting end portions (221) of each energy absorption subunit (22), and the other one of said connecting cables (21) extends through said through holes (224) and said open grooves (225) of the other one of said cable-connecting end portions (221) of each energy absorption subunit (22).

5. The wave-energy absorption system as claimed in claim 3, wherein each of said energy absorption units (20) further includes a plurality of support cable subunits (26) connected respectively to said energy absorption subunits (22), each of said support cable subunits (26) including two support cables (261) that are connected respectively to top and bottom ends of said central portion (222) of a respective one of said energy absorption subunits (22), each of said support cables (261) having opposite ends that are connected respectively to said connecting cables (21).

6. The wave-energy absorption unit as claimed in claim 3, wherein:

said frame unit (10) further includes two support braces (14), each of which is disposed above a respective one of said inclined brace structures (13), and interconnects a top end of a respective one of said front brace structures (11) and a top end of a respective one of said rear brace structures (12), a rear transverse brace (15) that extends in the left-right direction (X) and that interconnects said top ends of said rear brace structures (12), and a wave-breaking structure (16) that is mounted to said front brace structures (11); and said wave-breaking structure (16) has an upper transverse brace (161) that extends in the left-right direction (X) and that interconnects said top ends of said front brace structures (11), a lower transverse brace (162) that extends in the left-right direction (X) and that interconnects bottom ends of said front brace structures (11), a front end brace (163) that is disposed in front of said upper and lower transverse braces (161, 162), two upper connecting braces (164), each of which interconnects a top end of said front end brace (163) and said top end of a respective one of said front brace structures (11), two lower connecting braces (165), each of which is disposed below a respective one of said upper connecting braces (164), and interconnects a bottom end of said front end brace (163) and said bottom end of a respective one of said front brace structures (11), two stainless steel front nets (166), each of which is mounted in a space collectively defined by said front end brace (163), a corresponding one of said upper connecting braces (164), a corresponding one of said lower connecting braces (165), and a corresponding one of said front brace structures (11), and a stainless steel rear net (167) that is mounted in a space collectively defined by said brace structures (11), said upper transverse brace (161) and said lower transverse brace (162).

7. The wave-energy absorption system as claimed in claim 6, wherein:

each of said rear brace structures (12) includes two rear braces (121), each of which is elongated and has a top end inclined toward said top end of the other one of said rear braces (121), and a connecting plate (122) connected between said rear braces (121);

each of said front brace structures (11), said rear braces (121) of said rear brace structures (12), said inclined brace bodies (13) of said inclined brace structures (13), said support braces (14), said rear transverse brace (15), and said upper and lower transverse braces (161, 162), said front end brace (163) and said upper and lower connecting braces (164, 165) of said wave-breaking structure (16) is configured as a tube with opposite ends thereof being closed; and said at least one wave-energy absorption device (100) further includes an anchor unit (40) including a plurality of positioning anchors (41), and a plurality of anchor-connecting cables (42), each of which connects a respective one of said positioning anchors (41) to said frame unit (10).

8. The wave-energy absorption system as claimed in claim 7, wherein said frame unit (10) further includes a plurality of floating boards (17) that are mounted to said support braces (14), said rear transverse brace (15), said upper transverse brace (161) and said upper connecting braces (164) of said wave-breaking structure (16).

9. The wave-energy absorption system as claimed in claim 1, wherein:

each of said front brace structures (11) has an upper front leg (111), a front brace clamp (112) that is mounted to said upper front leg (111), and a lower front leg (113) that has a front hook-connecting ring (114), and that is clamped to said front brace clamp (112), said front brace clamp (112) being operable to permit movement of said lower front leg (113) relative to said upper front leg (111) in a direction parallel to said upper front leg (111);

each of said rear brace structures (12) has two upper rear legs (123), each of which is elongated and has a top end inclined toward said top end of the other one of said upper rear legs (123), two rear brace clamps (125) that are respectively mounted to said upper rear legs (123), and two lower rear legs (126), each of which has a rear hook-connecting ring (127), and is clamped to a respective one of said rear brace clamps (125), each of said rear brace clamps (125) being operable to permit movement of a respective one of said lower rear legs (126) relative to a respective one of said upper rear legs (123) in a direction parallel to said upper rear leg (123); and said at least one absorption unit (20) further includes two float ropes (27) that are respectively connected to said connecting cables (21), and a float (28) that is connected to said float cables (27).

10. The wave-energy absorption system as claimed in claim 9, wherein said at least one energy absorption device (100) further includes a ground anchor unit (30) that has a plurality of positioning blocks (31), and a plurality of connecting ropes (32) that are connected to said frame unit (10) and that are respectively connected to said positioning blocks (31).

\* \* \* \* \*